(12) United States Patent
Knight

(10) Patent No.: US 6,760,788 B2
(45) Date of Patent: Jul. 6, 2004

(54) DOMAIN VALIDATION PROCESS THAT IS TRANSPARENT TO A DEVICE DRIVER

(75) Inventor: Frederick E. Knight, Merrimack, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 09/998,439

(22) Filed: Nov. 30, 2001

(65) Prior Publication Data

US 2003/0105905 A1 Jun. 5, 2003

(51) Int. Cl.$^7$ .......................... G06F 13/38; G06F 13/10
(52) U.S. Cl. ........................ 710/19; 710/15; 710/18; 710/62; 710/74; 710/306; 710/313
(58) Field of Search ............................ 710/8, 10, 15, 710/18, 19, 62–64, 72, 74, 100, 104, 305, 306, 311, 313; 713/1, 100; 714/3–7, 25, 32, 40, 46, 48, 769–771; 719/318, 321, 326

(56) References Cited

U.S. PATENT DOCUMENTS

| | | | |
|---|---|---|---|
| 4,322,793 A | * | 3/1982 | Andersson et al. ......... 710/305 |
| 5,991,829 A | * | 11/1999 | Giorgio et al. ............... 710/15 |
| 6,256,695 B1 | | 7/2001 | Williams et al. ............ 710/107 |
| 6,269,422 B1 | * | 7/2001 | McDonald et al. ......... 711/111 |

OTHER PUBLICATIONS

*Information Technology SCSI Domain Validation (SDV)*, Terry Gibbons, Working Draft Technical Report, Revision 07, Sep. 21, 2001 (19 p.).

*Information Technology—SCSI-3 Architecture Model*, Charles Monia, Draft, X3T10, 994D, Revision 18, Nov. 27, 1995 (73 p.).

* cited by examiner

*Primary Examiner*—Ilwoo Park

(57) ABSTRACT

A computer system includes a SCSI bus for which domain validation processes can occur transparently (i.e., without device driver involvement). The system includes a SCSI bus adapter which runs firmware to support the domain validation process. The adapter initiates the domain validation process with respect to the peripheral devices on the SCSI bus. If any one or more SCSI peripheral device reports the presence of sense data to the SCSI adapter, the adapter records the sense data in its memory, or at least records that sense data was reported by a peripheral device. Then, towards or at completion of the domain validation process, the bus adapter resets the entire bus, or alternatively, resets only those peripheral devices that actually reported the presence of sense data. By resetting the devices, their device drivers will automatically initialize the devices thereby making the drivers again aware of the state of the devices.

26 Claims, 2 Drawing Sheets

DOMAIN VALIDATION PROCESS THAT IS TRANSPARENT TO A DEVICE DRIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a domain validation process for a bus (e.g., SCSI bus). More particularly, the invention relates to a domain validation process for a SCSI bus that is transparent to drivers associated with devices coupled to the bus. More particularly still, the invention relates to making a bus device driver aware of a state change of a device during a domain validation process that is transparent to the device driver.

2. Background of the Invention

Many types of electrical systems (e.g., computers) include a small computer system interface ("SCSI") to which one or more peripheral devices attach. The SCSI bus is particularly well suited for tape drives, CD ROM drives, and the like. One of the features specified in the SCSI standards is that a SCSI-compliant device can include a memory device into which "sense data" can be stored. Such sense data includes a variety of information. In the context of a tape drive, the sense data may indicate "end of tape," "rewind," etc. For a CD ROM drive, the sense data may indicate if the programmed block size associated with the disk has been changed.

A characteristic of the SCSI sense data is that it is generally only present in a SCSI device when a change has occurred only until the sense data is read by external logic such as a SCSI bus adapter. For example, a tape drive may have no sense data in its memory reserved for storing sense data. Then, when the end of tape condition occurs, the tape drive writes a value to the memory to indicate that the end of tape condition has occurred. That end of tape sense data remains in the tape drive's memory until the SCSI adapter reads the sense data. The tape drive alerts the SCSI adapter that sense data is present and the adapter responds by reading the tape drive's sense data. Once the sense data has been read, the tape drive clears the memory location in which the sense data was stored. Essentially, SCSI sense data is a "read once" type of data.

The SCSI standard is a highly flexible standard that permits system designers to assemble together various disparate types of devices. Because of this flexibility, it is possible for designers and operators of computers with SCSI components to violate, intentionally or not, certain basic requirements. For instance, two 16 bit SCSI devices might be mistakenly interconnected by an 8 bit cable (referred to as a "width" problem). In this situation, an error will not necessarily be reported, but every other byte of data will be dropped. By way of another example, an 80 MB/sec bridge device might be disposed between two 160 MB/sec SCSI devices (referred to as a "speed" problem). As such, the devices will not be able to correctly communicate at their full speed.

For problems such as those described above, the current version of the SCSI standard ("SCSI-3") includes a provision for a "domain validation" process. The domain validation process includes several tests that can be run. A basic test, for example, determines if the SCSI subsystem is capable of operating at a specified speed and width. Generally speaking, this test executes by sending a predetermined test pattern to a SCSI target device. Then, the target device is requested to return the test pattern and the returned test pattern is compared against the original pattern to ensure it is identical. The domain validation process is typically initiated during boot, and at other times by a specific user request. After a user changes a SCSI device or cable, for example, the user must request to run the domain validation process.

The SCSI-3 standard allows that the domain validation process be, if desired, transparent to the SCSI device drivers. When the domain validation process runs transparently, the device drivers are not involved in the performance of the test. A transparently run domain validation advantageously minimizes the complexity of the device drivers themselves and minimizes the performance impact on the system while running the domain validation.

Although a generally advantageous process, a transparently run domain validation process can result in a device driver being unaware of the current state of its device. This problem occurs when sense data becomes present during the domain validation process. For example, if a SCSI device or the entire SCSI bus is reset during the domain validation process or a tape reaches its end of tape condition during a domain validation process, such sense data will be made available in the effected devices. Such information will then be read by the SCSI adapter which is performing the domain validation process and then, as noted above, erased from the device. The SCSI adapter cannot pass the sense data on to the device's driver because, in a transparently run domain validation process, the device driver has no involvement. Thus, with nothing else to do with the sense data, the SCSI adapter simply drops the sense data. This situation is typically referred to as "losing state" because the adapter drops the information and the device itself erased the sense data after the adapter read it.

Most importantly, the device's driver is unaware that its device had sense data. If that lost state was an end of tape condition, the driver will be unaware that the tape is at its logical end. For CD ROM drives, for example, another piece of logic in the system may change the block size associated with the CD ROM during the domain validation. The device driver associated with the CD ROM will be unaware of this change and thus be unable to accurately retrieve date from the CD.

solution to this problem is needed. Such a solution preferably would make it possible for a device driver to be made aware of a state change that occurred during a domain validation process that runs transparently with regard to the device driver.

BRIEF SUMMARY OF THE INVENTION

The problems noted above are solved in large part by an electronic system, such as a computer, which includes a bus, such as a SCSI bus, for which domain validation processes can occur transparently (i.e., without device driver involvement). The preferred embodiment of the system includes a SCSI bus adapter which runs firmware to support the domain validation process. The adapter initiates the domain validation process with respect to the peripheral devices on the SCSI bus. If any one or more SCSI peripheral device reports the presence of sense data to the SCSI adapter, the adapter records that sense data in its memory, or at least records that sense data was reported by a peripheral device. Then, towards completion of the domain validation process, the bus adapter resets the entire bus, or alternatively, resets only those peripheral devices that actually reported the presence of sense data.

By resetting the bus, or a subset of devices, the devices' device drivers will automatically be re-synchronized with their devices. The next time the device driver attempts to access the reset device, the device will report to the driver that it has been reset, in accordance with normal SCSI procedure. The driver will then initialize the device and, at that point, both the driver and its device will be synchronized (i.e., the driver will be accurately aware of the operational state of the device). In short, the reset during the domain validation process is used as a mechanism to cause the driver and device to again be synchronized following a change of state during a transparent domain validation of which the device driver would otherwise be unaware.

These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

The preferred embodiment described below is shown in the context of a SCSI bus and its domain validation process. Broadly, however, this disclosure and the claims which follow should not be limited to just the SCSI bus, but rather should apply to other types of busses having the same or similar type of issue noted above.

Figure 1:
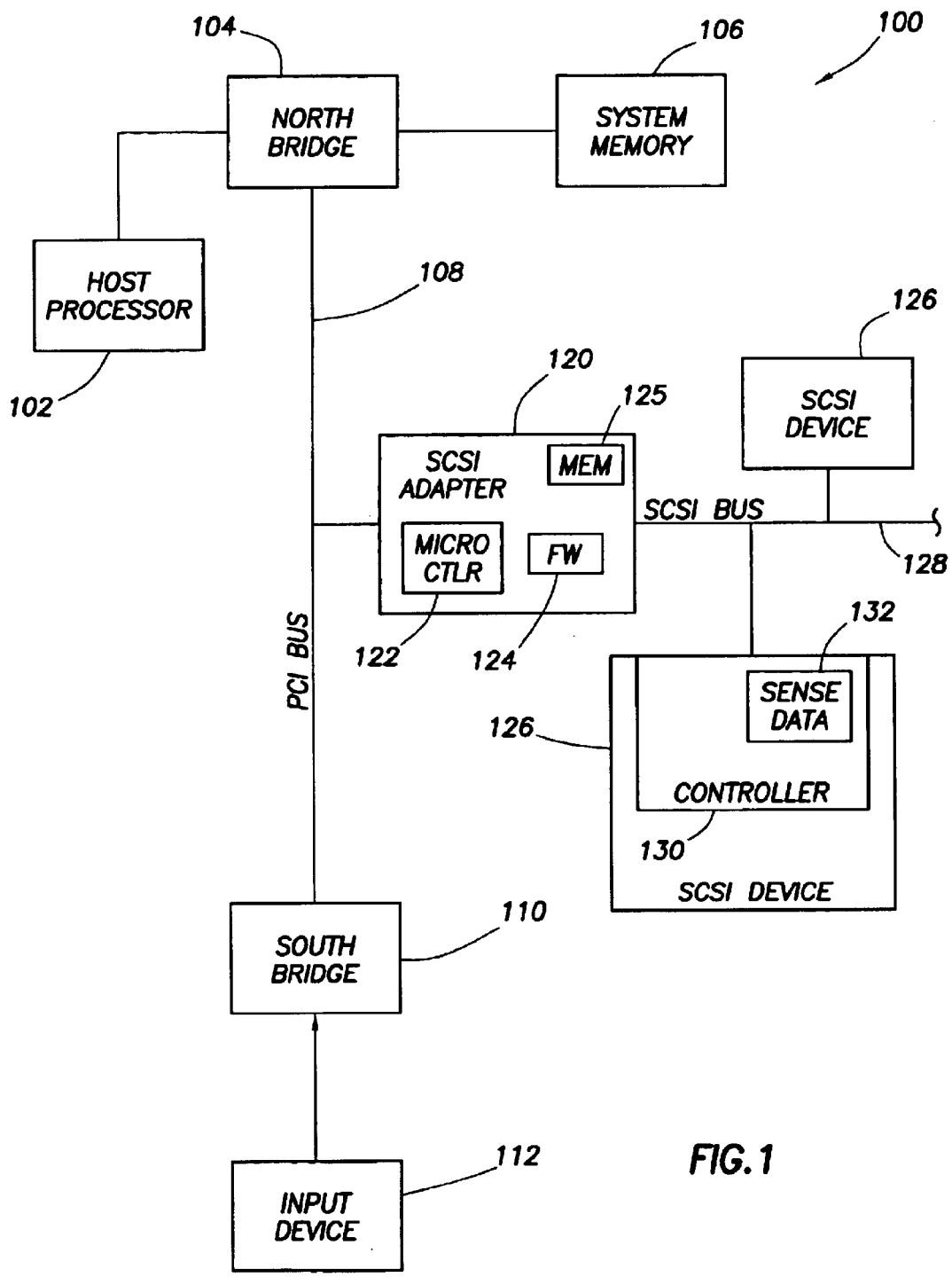
FIG. 1 shows a computer system embodying the preferred embodiment of the invention.

Referring now to FIG. 1, system 100 is shown constructed in accordance with a preferred embodiment of the invention. As shown, system 100 includes a host processor 102, a north bridge 104, system memory 106, a south bridge 110, an input device 112 (e.g., a mouse or keyboard), a SCSI adapter 120 and various SCSI-compliant devices 126 coupled to said SCSI adapter via a SCSI bus 128. The north bridge couples to the processor 102 and memory 106 and couples to the south bridge 110 via a peripheral component interconnect ("PCI") bus 108 (or other suitable type of bus). As shown, the SCSI adapter 120 couples to the PCI bus 108, but alternatively may attach to the system in other ways.

The SCSI adapter 120 includes many components as is commonly known. Several of those components are shown in FIG. 1 as a microcontroller 122, firmware 124 and a memory device 125 (preferably volatile memory). The firmware 124 is executed in whole or in part by controller 122 (a portion of the firmware may be executed by the host processor 102). Memory can be used as a temporary location to store data or instructions. For example, firmware 122 may permanently reside in non-volatile memory, such as a read only memory ("ROM"), copied to volatile memory 125 and executed therefrom by controller 122.

Each SCSI device 126 preferably includes a controller 130 to provide an interface to the SCSI bus 128. Within the controller 130, memory 132 is included in which sense data can be stored by the controller. Not all SCSI devices necessarily have sense data, but those devices that have sense data preferably include memory storage for the sense data. Device drivers for the SCSI devices 126 preferably are executed by the host processor 102.

Figure 2:
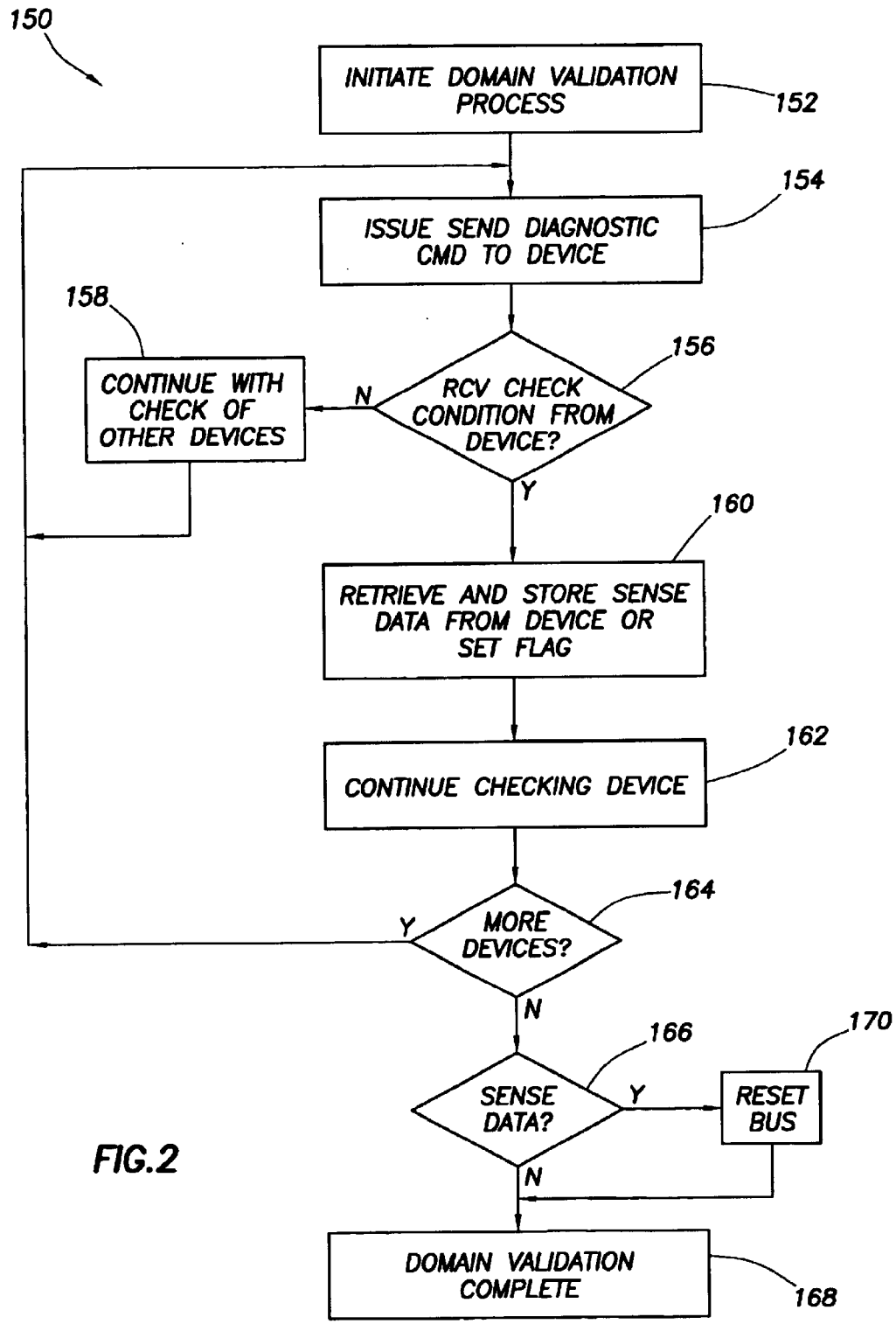
FIG. 2 shows a method in which a SCSI bus is reset during domain validation to make the domain validation backward compatible with prior versions of the SCSI standard that do not support domain validation.

When it is desired to perform a transparent domain validation process, the SCSI adapter 120 is signaled to begin the process. The preferred embodiment of this process is shown in FIG. 2 which should be reviewed in conjunction with the system diagram of FIG. 1. Preferred method 150 starts with step 152 in which the domain validation process is started. At this point, a domain validation flag can be set to false. This step may be triggered by a user requesting the initiation of the domain validation process following replacement of a SCSI device. In response, the SCSI adapter 120 runs its firmware to perform steps 154–166. In step 154 the SCSI adapter issues a diagnostic command to a device 126 on the SCSI bus 128. This command causes any one of a variety of tests to be performed which preferably are specified as part of the command itself and is part of the normal domain validation process. If the state of a device on bus 128 changes during the domain validation process, as detected by step 156 (by the device providing a check condition message), steps 160–166 are performed. Otherwise, if no sense data is made available during the domain validation process, control continues in step 158 and the remaining devices on the bus 128 are checked as well.

If a device reports to the SCSI adapter that it has sense data available, the adapter issues a request sense command to retrieve the sense data from the device in step 160 or simply stores the fact that a device on the bus reported a check condition. For example, the domain validation flag noted above can be set to true to indicate the existence of sense data. In step 162, the domain validation process is continued with respect to that particular device. Step 162 may include, for example, issuing a receive diagnostic command to retrieve the results of the diagnostic test initiated in step 154 and analyzing the results for a domain validation error. Control then loops back to step 154 for the next device 126 on the SCSI bus 128 if step 164 determines that additional devices are present. When all devices on the SCSI bus 128 have completed the domain validation process, the loop is exited. In step 166, the flag is examined.

If it is set to true, the SCSI adapter resets the SCSI bus (170) and the domain validation completes in step 168. If the flag is false, the SCSI bus is not reset and the domain validation process completes in step 168.

If the bus is reset, the width and speed negotiations must be reestablished with each device 126 on the SCSI bus 128. This is performed using the results of the just completed domain validation process. After a bus reset is issued, no commands capable of generating a check condition are issued to any device on the SCSI bus.

The bus reset in step 164 is used a mechanism to ensure that the device driver(s) are "synchronized" to the devices themselves. That is, the device drivers and devices are placed into a state in which each driver accurately knows the current operational status of its device. In accordance with the preferred embodiment of the invention, this is accomplished by causing the devices on the SCSI bus 128 to transition to a predetermined state which will eventually cause an action by the device's driver which, in turn, will cause the driver to be accurately aware of the state of the device. The state to which the device is transitioned by the adapter preferably is the reset state. In accordance with normal SCSI behavior, the first access by a driver to a device that has been reset results in the device reporting to the driver that the device, in fact, has been reset. Further, the driver then initializes the device after which the driver and device can be used for normal operation. Thus, by resetting the devices, their drivers will ultimately initialize the devices and, at that point, the devices and drivers will be synchronized. Moreover, the bus reset action in 164 is a technique by which conventional SCSI protocols can be used to synchronize drivers and devices.

In an alternative embodiment, rather than resetting all of the devices on the SCSI bus, the SCSI adapter 120 can keep a record in its memory 125 as to which SCSI devices 126 have reported sense data during the domain validation process (the flag may be stored on a per device basis). The addresses associated with the device can be used to keep track of which devices have reported sense data. Then, the adapter can cause just those devices to reset, not all of the devices on the bus 128. A bus device reset ("BDR") message can be transmitted to the device(s) that reported sense data. Then, the drivers associated with the reset devices will become re-synchronized with their devices. All other SCSI devices are not reset. This alternative embodiment provides a finer granularity of system control in that only those devices are reset, and subsequently re-initialized, for which the driver may not be aware of the current operational state of the device The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a host processor;
   a bus adapter coupled to said host processor; and
   a bus device coupled to said bus adapter via a bus, said bus device including storage capacity for sense data regarding the state of the bus device;
   wherein said bus adapter performs a test of said bus device and if said bus device reports that it has sense data, said bus adapter causes said bus device to be reset.

2. The computer system of claim 1 further including a plurality of bus devices coupled to said bus adapter via said bus and said adapter resets all of the bus devices if any of the devices reports that it has sense data.

3. The computer system of claim 1 further including a plurality of bus devices coupled to said bus adapter via said bus and said adapter selectively resets only those bus devices that report the existence of sense data.

4. The computer system of claim 1 wherein said bus is a SCSI bus.

5. The computer system of claim 1 wherein resetting said bus device causes a driver associated with said bus device to initialize said bus device.

6. A method of performing domain validation process in a system comprising a SCSI adapter coupled to at least one SCSI peripheral device over a SCSI bus, comprising:
   (a) initiating the domain validation process;
   (b) issuing a send diagnostic command to a SCSI peripheral device;
   (c) receiving a check condition from said peripheral device during said domain validation process indicating that sense data is present in said peripheral device;
   (d) causing said peripheral device to be reset;
   (e) completing said domain validation process.

7. The method of claim 6 wherein said domain validation process is performed without involvement of a device driver associated with said peripheral device.

8. The method of claim 6 wherein said system includes a plurality of SCSI peripheral devices coupled to said SCSI bus and including resetting all SCSI peripheral devices when any one of said peripheral devices reports the presence of sense data.

9. The method of claim 8 further including, upon completion of said domain validation process, a SCSI peripheral device reporting to a device driver that the SCSI peripheral device has been reset.

10. The method of claim 9 wherein said device driver initializes said peripheral device.

11. The method of claim 10 further including, upon completion of said domain validation process, the SCSI peripheral device reporting to a device driver that the SCSI peripheral device has been reset.

12. The method of claim 11 wherein said device driver initializes said peripheral device.

13. A system, comprising:
    a bus adapter; and
    a bus device coupled to said bus adapter via a bus, said bus device including storage capacity for sense data regarding the state of the bus device;
    wherein said bus adapter performs a test of said bus device and if said bus device reports that it has sense data, said bus adapter causes said bus device to be reset.

14. The system of claim 13 further including a plurality of bus devices coupled to said bus adapter via said bus and said adapter resets all of the bus devices if any of the devices reports that it has sense data.

15. The system of claim 13 further including a plurality of bus devices coupled to said bus adapter via said bus and said adapter selectively resets only those bus devices that report the existence of sense data.

16. The system of claim 13 wherein said bus is a SCSI bus.

17. The system of claim 13 wherein resetting said bus device causes a driver associated with said bus device to initialize said bus device.

18. A computer system, comprising:

a host processor;

a north bridge coupled to said host processor;

a SCSI bus adapter coupled to said north bridge; and a peripheral device coupled to said SCSI bus adapter via a SCSI bus, said peripheral device including storage capacity for sense data regarding the state of the peripheral device;

wherein said SCSI bus adapter performs a domain validation process of said SCSI bus without involvement of a device driver associated with said peripheral device and if, during said domain validation process, said peripheral device reports the presence of sense data, said SCSI bus adapter causes said peripheral device to transition to a state so that, after the completion of said domain validation process, said device driver will become synchronized with said peripheral device.

19. The computer system of claim 18 wherein said state is a reset state.

20. The computer system of claim 19 wherein resetting said peripheral device causes a driver associated with said peripheral device to initialize said peripheral device.

21. The computer system of claim 18 further including a plurality of peripheral devices coupled to said SCSI bus adapter via said SCSI bus and said SCSI adapter causes all of the peripheral devices to transition to said state if any of the peripheral devices reports the presence of sense data.

22. The computer system of claim 21 wherein said state is a reset state.

23. The computer system of claim 22 wherein resetting said peripheral devices causes drivers associated with said peripheral devices to initialize said peripheral devices.

24. The computer system of claim 18 further including a plurality of peripheral devices coupled to said SCSI bus adapter via said SCSI bus and said SCSI adapter selectively resets only those peripheral devices that report the presence of sense data.

25. The computer system of claim 24 wherein said state is a reset state.

26. The computer system of claim 25 wherein resetting said peripheral devices causes drivers associated with said peripheral devices to initialize said peripheral devices.

* * * * *